(12) United States Patent
Kanalec

(10) Patent No.: US 11,056,990 B2
(45) Date of Patent: Jul. 6, 2021

(54) METHOD OF OPERATING AN ELECTRICAL GENERATOR

(71) Applicant: Mahle International GmbH, Stuttgart (DE)

(72) Inventor: Stas Kanalec, Dobrovo v Brdih (SI)

(73) Assignee: Mahle International GmbH

( * ) Notice: Subject to any disclaimer, the term of this patent is extended or adjusted under 35 U.S.C. 154(b) by 0 days.

(21) Appl. No.: 16/801,132

(22) Filed: Feb. 25, 2020

(65) Prior Publication Data

US 2020/0274470 A1    Aug. 27, 2020

(30) Foreign Application Priority Data

Feb. 26, 2019 (EP) ..................................... 19159345

(51) Int. Cl.
*H02P 9/10* (2006.01)
*H02P 101/45* (2016.01)

(52) U.S. Cl.
CPC .......... *H02P 9/107* (2013.01); *H02P 2101/45* (2015.01)

(58) Field of Classification Search
CPC .............................. H02P 9/107; H02P 2101/45
USPC .......................................... 322/7, 28, 33, 36
See application file for complete search history.

(56) References Cited

U.S. PATENT DOCUMENTS

| | | | | |
|---|---|---|---|---|
| 5,198,744 A | * | 3/1993 | Kohl ....................... | H02P 9/006 322/33 |
| 5,548,202 A | * | 8/1996 | Schramm ................. | H02H 6/00 322/33 |
| 5,637,985 A | * | 6/1997 | Kakizaki ................... | H02J 7/24 322/28 |
| 5,982,155 A | * | 11/1999 | Rechdan .................... | H02P 9/30 322/36 |
| 6,081,103 A | * | 6/2000 | Pierret .................. | H02J 7/2434 322/36 |

(Continued)

FOREIGN PATENT DOCUMENTS

| | | |
|---|---|---|
| CN | 206 673 801 U | 11/2017 |
| JP | 3 009976 B2 | 2/2000 |

OTHER PUBLICATIONS

English abstract for JP-3 009976.
English abstract for CN-206 673 801.

*Primary Examiner* — Pedro J Cuevas
(74) *Attorney, Agent, or Firm* — Fishman Stewart PLLC

(57) ABSTRACT

A method of operating an electrical generator with a control unit may include: providing an electrical output voltage by rotating a rotor unit relative to a stator unit at a given rotation speed; providing the control unit with a control unit supply voltage; determining a control unit supply voltage value of the control unit supply voltage; providing the rotor unit with a rotor supply voltage; determining a rotation speed of the rotor unit; determining an ambient temperature of the electrical generator; determining a rotor supply voltage value for the determined rotation speed, and the determined ambient temperature and the determined control unit supply voltage value at which the electrical generator may have a maximal permitted thermal load; and operating the electrical generator at the maximal permitted thermal load by at least one of adjusting and controlling the rotor supply voltage of the rotor unit to the determined rotor supply voltage value.

20 Claims, 2 Drawing Sheets

(56) References Cited

U.S. PATENT DOCUMENTS

| | | | | |
|---|---|---|---|---|
| 6,184,661 B1* | 2/2001 | Becker | | H02P 9/30 |
| | | | | 322/25 |
| 6,222,349 B1* | 4/2001 | LeRow | | H02J 7/007192 |
| | | | | 322/34 |
| 6,300,746 B1 | 10/2001 | Mueller et al. | | |
| 6,320,350 B1* | 11/2001 | Take | | H02P 5/74 |
| | | | | 318/114 |
| 6,414,832 B1* | 7/2002 | Crecelius | | H02J 7/1461 |
| | | | | 361/106 |
| 6,529,064 B2* | 3/2003 | Hachmeister | | F02D 41/20 |
| | | | | 327/512 |
| 6,809,428 B1* | 10/2004 | Blackburn | | F02N 11/04 |
| | | | | 290/36 R |
| 7,116,081 B2* | 10/2006 | Wilson | | H02P 9/006 |
| | | | | 322/33 |
| 7,199,559 B2* | 4/2007 | Yanagi | | H02P 9/48 |
| | | | | 322/28 |
| 7,276,882 B2* | 10/2007 | Minks | | H02J 7/1492 |
| | | | | 322/24 |
| 7,288,922 B2* | 10/2007 | Maehara | | H02H 6/005 |
| | | | | 290/40 C |
| 7,602,152 B2* | 10/2009 | Oshima | | H02P 29/60 |
| | | | | 322/33 |
| 8,446,131 B2* | 5/2013 | Matt | | H02P 9/305 |
| | | | | 322/44 |
| 9,300,239 B2* | 3/2016 | Hart | | H02P 23/26 |
| 9,590,545 B2* | 3/2017 | Frampton | | H02P 9/14 |
| 9,935,571 B2* | 4/2018 | Frampton | | H02P 9/14 |
| 9,998,045 B2* | 6/2018 | Frampton | | H02P 9/009 |
| 10,256,758 B2* | 4/2019 | Frampton | | H02P 9/14 |
| 10,804,827 B2* | 10/2020 | Hoffmann | | F02B 63/042 |
| 2004/0222772 A1* | 11/2004 | Fujita | | H02P 9/48 |
| | | | | 322/28 |
| 2006/0181248 A1 | 8/2006 | Aoyama | | |
| 2012/0256422 A1* | 10/2012 | Fradella | | H02K 21/24 |
| | | | | 290/55 |
| 2016/0149527 A1* | 5/2016 | Frampton | | H02P 9/00 |
| | | | | 322/17 |
| 2016/0149528 A1* | 5/2016 | Frampton | | H02P 9/14 |
| | | | | 322/20 |
| 2016/0226428 A1 | 8/2016 | Kim | | |
| 2016/0301345 A1* | 10/2016 | Frampton | | H02P 9/04 |
| 2018/0131301 A1* | 5/2018 | Frampton | | H02K 7/1815 |
| 2018/0131302 A1* | 5/2018 | Frampton | | H02P 9/00 |
| 2019/0190418 A1* | 6/2019 | Frampton | | H02P 9/009 |

* cited by examiner

METHOD OF OPERATING AN ELECTRICAL GENERATOR

CROSS-REFERENCE TO RELATED APPLICATIONS

This application claims priority to European Patent Application No. EP19159345.8, filed on Feb. 26, 2019, the contents of which are hereby incorporated by reference in their entirety.

TECHNICAL FIELD

The present invention relates to a method of operating an electrical generator, particularly an alternator for a vehicle. Furthermore, the invention relates to a control unit which is formed and/or programmed to perform the method according to the invention. Furthermore, the invention relates to an electrical generator, particularly an alternator for a vehicle, which comprises such a control unit which is formed and/or programmed to perform the method according to the invention.

BACKGROUND

In the state of the art, a thermal overload of electrical generator subcomponents like a stator unit or a rectifier unit is prevented by the rotor field coil design of a rotor unit, in particular by limiting the ampere-turns (amp-turn ratio) of the rotor coil.

Due to thermal effects, the resistance of the rotor coil increases and leads to a lower current flow which in turn reduces the electrical output power of the electrical generator. The amp-turn ratio is optimized to provide a high electrical resistance at a critical rotation frequency and/or rotation speed of the rotor unit. Due to this, the electrical resistance at higher rotation frequencies and/or rotation speeds of the alternator leads to lower electrical power generated by the electrical generator. The critical rotation frequency and/or rotation speed is not the highest rotation frequency and/or rotation speed at which the alternator can be operated. Thus, this approach limits the electric power output of the electrical generator at rotation frequencies and/or rotation speeds higher than the critical rotation frequency and/or rotation speed as well as in cases where cooling of the electrical generator is sufficient and a thermal overloading is not a concern. Additionally, a step load response of the electrical generator cannot be controlled.

SUMMARY

The present invention is based on the task of specifying a method of operating an electrical generator as well as of specifying a control unit and an electrical generator which reduces the explained drawback.

This problem is solved according to the invention by the subject matter of the in-dependent claims. Advantageous embodiments are the subject matter of the de-pendent claims.

The present invention is based on the general concept that the electrical generator is operated at the maximal permitted thermal load at rotation frequencies and/or rotation speeds higher than the critical rotation frequency and/or rotation speed.

The innovative method of operating an electrical generator, particularly an alternator for a vehicle, with a control unit comprises the steps: providing an electrical output voltage by rotating a rotor unit relative to a stator unit at a given rotation speed, the control unit is provided with a control unit supply voltage, the control unit determines a control unit supply voltage value of the control unit supply voltage, the control unit provides the rotor unit with a rotor supply voltage, the control unit determines the rotation speed of the rotor unit, the control unit determines an ambient temperature of the electrical generator, the control unit determines a rotor supply voltage value for the determined rotation speed, and the determined ambient temperature and the determined control unit supply voltage value at which the electrical generator has a maximal permitted thermal load, the control unit operates the electrical generator at the maximal permitted thermal load by adjusting and/or controlling the rotor supply voltage of the rotor unit to the determined rotor supply voltage value.

The control unit may be a regulator which regulates the output voltage of the electrical generator. The control unit may be formed by an integrated circuit, microprocessors and/or microcontroller.

The ambient temperature of the electrical generator is not the temperature in the vicinity of the rotor unit and/or rotor windings. However, the temperature in and/or of the control unit, in particular the voltage regulator and/or the voltage regulator IC, is considered to represent the ambient temperature of the electrical generator and not the temperature of the electrical generator itself.

The control unit, in particular the voltage regulator and/or the voltage regulator IC, may measure its own temperature which is substantially dependent on ambient temperature of the electrical generator. This temperature may be marginally affected for example by the supply voltage and the rotor speed (cooling), however, the ambient temperature of the electrical generator dominates the temperature in and/or of the control unit, in particular the voltage regulator and/or the voltage regulator IC. Additionally, the temperature in and/or of the control unit, in particular the voltage regulator and/or the voltage regulator IC, is not influenced by other subassemblies of the electrical generator, like the rotor unit or stator unit, etc. Thus, the temperatures of other subassemblies of the electrical generator, like the rotor unit or stator unit, are not measured.

The vehicle may be a car and/or an electrical driven car and/or an electrical tractor and/or an utility vehicle such as green mowers.

The electrical generator transforms mechanical energy which is supplied to the electrical generator by rotation the rotor unit relative to a stator unit at a given rotation speed into an electrical energy in form of direct current and/or direct voltage. The electrical output voltage of the electrical generator may be 14V, 28V, 48V or 56V. The rotation speed may be in the rotation speed range of 1100 to 15000 rpm, particularly 3500 to 10000 rpm.

The control unit provides the rotor unit with a rotor supply voltage, wherein the rotor supply voltage value may be controlled and/or adjusted by pulse-width modulation of the control unit supply voltage. The pulse-width modulated control unit supply voltage may form the rotor supply voltage and may be provided to the rotor unit. The control unit may determine the rotation speed of the rotor unit by measuring the frequency of the induced voltage and/or current within the stator unit. The control unit may have stored a number of pole pairs of the rotor unit. The control unit may determine the ambient temperature of the electrical generator with a temperature sensor which may be integrated in the electrical generator and/or which may be integrated in the control unit.

A field duty cycle limitation map (which determines the maximum rotor supply voltage) may be programmed into a data storage, in particular a EEPROM, of the control unit, in particular of the voltage regulator and/or of the voltage regulator IC. This map may be determined by measurements at known conditions (for example: ambient temperature, rotor speed, supply voltage and/or stator temperature) and represents the maximum allowable field duty cycle at given operating conditions. Due to this map, the temperature in and/or of the control unit, in particular the voltage regulator and/or the voltage regulator IC, and the rotor speed and the maximum field duty cycle may be correlated. Thus, the temperature of windings, in particular rotor windings, is not measured and is thus not known.

Based on the measured rotor speed and temperature in and/or of the control unit, in particular the voltage regulator and/or the voltage regulator IC, which is substantially dependent on ambient temperature of the electrical generator, the field duty cycle limit may be pulled from the programmed map. Finally, a correction to the duty cycle may be made if the voltage regulator supply voltage is too high or too low.

The control unit may determine an external control unit supply voltage value and/or an internal control unit supply voltage value.

Since the electrical generator is operated at the maximal permitted thermal load within the whole rotation speed range of the electrical generator, a higher power density is achieved than in the state of the art.

Since the power density (generated electric power per weight and/or volume of the electrical generator) is improved, for certain applications with specific operation conditions a more compact electrical generator can be used.

In an advantageous embodiment of the solution according to the invention, the control unit supply voltage is an external control unit supply voltage provided by an external voltage source, and/or the control unit supply voltage is an internal control unit supply voltage provided by the electrical output voltage of the electrical generator, or the control unit supply voltage is a combination of an external control unit supply voltage provided by an external voltage source and an internal control unit supply voltage provided by the electrical output voltage of the electrical generator.

The external control unit supply voltage may be controlled and/or adjusted by pulse-width modulation.

In a case of a combination of the external control unit supply voltage and the internal control unit supply voltage, both supply voltage may be connected in parallel. The supply voltages may be separated by a diode or other means. In case of combination, internal control unit supply voltage may only supply a power stage (output mosfet).

The external control unit supply voltage may be 14V, 28V, 48V or 56V. The internal control unit supply voltage may be 14V, 28V, 48V or 56V. The external control unit supply voltage and the internal control unit supply voltage may be equal or different. The external control unit supply voltage may be higher or lower than the internal control unit supply voltage.

The external control unit supply voltage may be 14V while the internal control unit supply voltage may be 56V.

The external control unit supply voltage may be used for control unit supply and for rotor unit supply on a first start only (bootstrap). After the electrical generator and/or alternator energizes, the rotor unit may be supplied through the internal control unit supply voltage.

The external control unit supply voltage may be used for rotor unit supply in normal operation after the electrical generator and/or alternator energizes while the internal control unit supply voltage may be used during the step response events only.

It may be also possible to use a single voltage (internal/external) if the rotor unit is designed for a lower nominal voltage than used (i.e. 14V rotor, 28V supply).

A solution with only internal control unit supply may comprise a buck converter for control unit supply if the voltage is higher than 28V and a battery unit in the system (first start).

The control unit may determine an external control unit supply voltage value and/or an internal control unit supply voltage value.

In an advantageous embodiment of the solution according to the invention, the control unit provides a data storage unit in which at least one value table is stored. The control unit determines the rotor supply voltage value to be applied to the rotor unit by comparing the determined rotation speed, the determined ambient temperature and the determined control unit supply voltage value with the at least one stored value table. The at least one stored value table provides the relation between rotation speed of the rotor unit, the ambient temperature of the electrical generator, the determined control unit supply voltage value and a required rotor supply voltage value for an operation of the electrical generator at a maximal permitted thermal load. The rotor supply voltage value may be used to determine the required pulse-width modulation of the control unit supply voltage in order to form and/or generate the rotor supply voltage which is provided to the rotor unit. The control unit supply voltage value may be an external control unit supply voltage value and/or an internal control unit supply voltage value.

The value table may be formed as a function which provides the required rotor supply voltage to be applied to the rotor unit as a function of the rotation speed of the rotor unit, the ambient temperature of the electrical generator and the determined control unit supply voltage value. The function may use an interpolation method to determine intermediate values or may be implemented as a lookup table. The function may be executed and/or performed by the control unit. The control unit supply voltage value stored and/or given by the value table and/or function and/or lookup table may be an external control unit supply voltage value and/or an internal control unit supply voltage value. If a communication protocol is used (e.g. LIN), the function may be executed and/or performed, and/or the rotor supply voltage value may be computed and/or determined and/or performed by a vehicle ECU and only a command may be send to control unit.

In an advantageous embodiment of the solution according to the invention, the at least one stored value table is determined by measuring and/or adjusting the rotation speed of the rotor unit, the ambient temperature of the electrical generator and the determined control unit supply voltage value. By measuring the thermal load of the electrical generator, while the rotor supply voltage of the rotor unit is adjusted until the thermal load of the electrical generator reaches the maximal permitted thermal load, the required rotor supply voltage value for an operation of the electrical generator at a maximal permitted thermal load is determined. The rotor supply voltage value at which the maximal permitted thermal load of the electrical generator is achieved with the corresponding rotation speed of the rotor unit, the ambient temperature of the electrical generator and the determined control unit supply voltage value is stored in the value table. The control unit supply voltage value stored and/or given by the value table and/or function and/or lookup table may be an external control unit supply voltage value and/or an internal control unit supply voltage value. The determination of the value table may be performed for an individual electrical generator and/or for a class of electrical generators.

The at least one stored value table may be determined by measuring and/or adjusting the rotation speed of the rotor unit, the ambient temperature of the electrical generator and the control unit supply voltage, particularly the external control unit supply voltage. The determined control unit supply voltage value and/or determined external and/or determined internal control unit supply voltage value may be determined by the control unit.

The external control unit supply voltage may be controlled and/or adjusted by pulse-width modulation.

In an advantageous embodiment of the solution according to the invention, at least one stored value table is determined by measuring and/or adjusting the rotation speed of the rotor unit in the rotation speed range of 1100 to 15000 rpm, particularly 3500 to 10000 rpm, by measuring and/or adjusting the ambient temperature of the electrical generator in the temperature range of 15° C. to 130° C., particularly in the range of 20° C. to 90° C., particularly at 25° C. and/or 55° C. and/or 85° C. and by adjusting the control unit supply voltage value between 5V and 60V, particularly between 35V and 60V and/or between 20V and 40V and/or between 5V and 20V, particularly between 10V and 20V, particularly between 10V and 16V.

In an advantageous embodiment of the solution according to the invention, the electrical generator exceeds the maximal permitted thermal load for a predefined time period in order to improve the step load response of the electrical generator. Such electrical generator performs better in respect of the step load response than the state of the art electrical generators, especially if the electrical generator is formed as a batteryless system.

In a batteryless system a fast load response is imperative in order to prevent alternator output voltage brownout. Generally, the capacitors used on applications can supply less power than a battery.

Full electrical power may be applied to the rotor unit, while the previously described rotor supply voltage limitation is overridden or ignored.

In an advantageous embodiment of the solution according to the invention, the rotor unit is supplied with the internal control unit supply voltage and/or the external control unit supply voltage during the predefined time period without voltage limitation. A combination of internal control unit supply voltage and the external control unit supply voltage may be used in such a case.

Given a rotor unit nominal voltage, the rotor unit may be supplied by a rotor supply voltage during the predefined time period that is greater than the rotor unit nominal voltage (e.g. 28V or 56V applied to a 14V rotor). This improves the step response of the electrical generator.

In case of external control unit supply voltage of 14V and an internal control unit supply voltage of 56V, the amp turns during the load response event may be 4 times higher than during nominal operation at a voltage of 14V (56V applied to the 14V intended rotor coil).

In an advantageous embodiment of the solution according to the invention, the control unit initiates a cooling procedure after the predefined time period in order to reduce the thermal load of the electrical generator to the maximal permitted thermal load. The cooling procedure may include an adjustment of the rotor supply voltage of the rotor unit by the control unit.

In an advantageous embodiment of the solution according to the invention, a predefined electrical output voltage of the electrical generator is maintained and/or controlled by the control unit. The predefined electrical output voltage may be 14V, 28V, 48V or 56V.

Furthermore, the invention relates to a control unit for an electrical generator, particularly an alternator for a vehicle. The control unit is formed and/or programmed to perform the inventive method described above. The control unit may be a regulator which regulates the output voltage of the electrical generator. The control unit may be formed by an integrated circuit, microprocessors and/or microcontroller.

In an advantageous embodiment of the solution according to the invention, the control unit comprises an ambient temperature unit for determining the ambient temperature of the electrical generator, and/or a rotation speed unit for determining the rotation speed of the rotor unit, and/or a rotor supply voltage unit for controlling and/or adjusting the rotor supply voltage of the rotor unit, and/or a control unit supply voltage unit for determining the control unit supply voltage value of the control unit supply voltage, and/or a data storage unit for storing at least one value table, and/or an output voltage control unit for controlling and/or maintaining a predefined electrical output voltage of the electrical generator.

The rotor supply voltage unit may provide a pulse-width modulated control unit supply voltage to the rotor unit.

The control unit supply voltage unit may be formed to determine an external control unit supply voltage value and/or an internal control unit supply voltage value.

The control unit supply voltage unit may comprise a first unit for determining an external control unit supply voltage value and/or a second unit for determining an internal control unit supply voltage value.

Furthermore, the invention relates to an electrical generator, particularly an alternator for a vehicle, comprising: a rotor unit with at least one rotor coil, a stator unit with at least one stator coil, particularly three stator coils. The rotor unit is rotated relative to the stator unit at a given rotation speed providing mechanical energy that is converted into electrical energy. The electrical generator has an inventive control unit as described above.

In an advantageous embodiment of the solution according to the invention, the electrical generator is formed and/or operated as batteryless system. Such an electrical generator can provide an improved step load response in such a system.

In an advantageous embodiment of the solution according to the invention, the electrical generator comprises a rectifier unit which converts the alternating voltage of the stator coil to a direct voltage, and/or a safety unit for limiting the electrical output voltage to a maximum electrical output voltage, and/or a capacitor unit for reducing electrical output voltage ripples.

The rectifier unit may comprise six diodes. Two diodes may be connected in series and forming a pair, while the pairs of the diodes may be connected in parallel to each other. Between two diodes of a pair, a stator coil terminal may be connected. The stator unit and/or stator coil may provide a three-phase alternating current and/or a three-phase alternating voltage which may be converted in direct current and/or direct voltage by the rectifier unit.

The safety unit may comprise at least one Zener diode. The safety unit may comprise a combination of 14V and 28V Zener diodes in order to obtain a breakdown voltage between 62-65V (5 mA conduction at 25° C.) for an electrical generator with an output voltage of 48V or 56V. In the case of an electrical generator with an output voltage of 14V, exclusively 14V Zener diodes may be used, while with for an output voltage of 28V exclusively 28V Zener diodes may be used. The safety unit may comprise at least six Zener diodes. Two Zener diodes may be connected in series forming a pair, while the pairs of the Zener diodes may be connected in parallel to each other. In case of a 14V/28V system, the rectifier diodes may be directly replaced with Zener diodes which perform both rectification and overvoltage protection.

The safety unit may be connected in parallel to the rectifier unit or the safety unit may be contained and/or integrated and/or formed in/by the rectifier unit.

In an advantageous embodiment of the solution according to the invention, the three stator coils of the stator unit are arranged in a star configuration or in a delta configuration.

In an advantageous embodiment of the solution according to the invention, the rotor unit and/or the rotor coil is optimized for an operation beyond a critical rotation frequency and/or rotation speed. Thus, the power density of the electrical generator is further increased compared to the state of the art.

In an advantageous embodiment of the solution according to the invention, the rotor unit and/or the rotor coil provides an ampere-turn value of at least 2900 At, particularly of at least 3100 At, at a supply voltage of 14V, 28V, 48V or 56V and an ambient temperature of 20° C.

In an advantageous embodiment of the solution according to the invention, the rotor unit and/or the rotor coil has at least 300 turns, particularly at least 380 turns. At a supply voltage of 14V, ambient temperature of 20°, 380 rotor coil turns and an coil resistance of 17/10 Ohm, an ampere-turn value of 3130 A is provided.

In case of external control unit supply voltage of 14V and an internal control unit supply voltage of 56V, the amp turns during the load response event may be 4 times higher than during nominal operation with 14V (56V applied to the 14V in-tended rotor coil).

The ampere-turn value (amp-turn ratio) may be defined as the total number of rotor coil turns multiplied by the current flowing through the rotor coil. The amp-turn ratio is largest at a maximum current flow through the rotor coil and depends on rotor winding resistance (temperature dependent) and applied voltage.

Furthermore, the invention relates to a computer program (product) comprising instructions to cause the inventive device to execute the steps of the inventive method as described above. Furthermore, the invention relates to a computer-readable medium having stored thereon the computer program described above.

Furthermore, the invention may relate to a vehicle that may be a car and/or an electrical driven car and/or an electrical tractor and/or an utility vehicle such as green mowers. Such an inventive vehicle may comprise a method and/or a control unit and/or an electrical generator and/or an alternator according to the invention.

Further important features and advantages of the invention emerge from the de-pendent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawing and are explained in more detail in the description below, wherein the same reference signs refer to identical or similar or functionally identical components.

DETAILED DESCRIPTION

Figure 1:
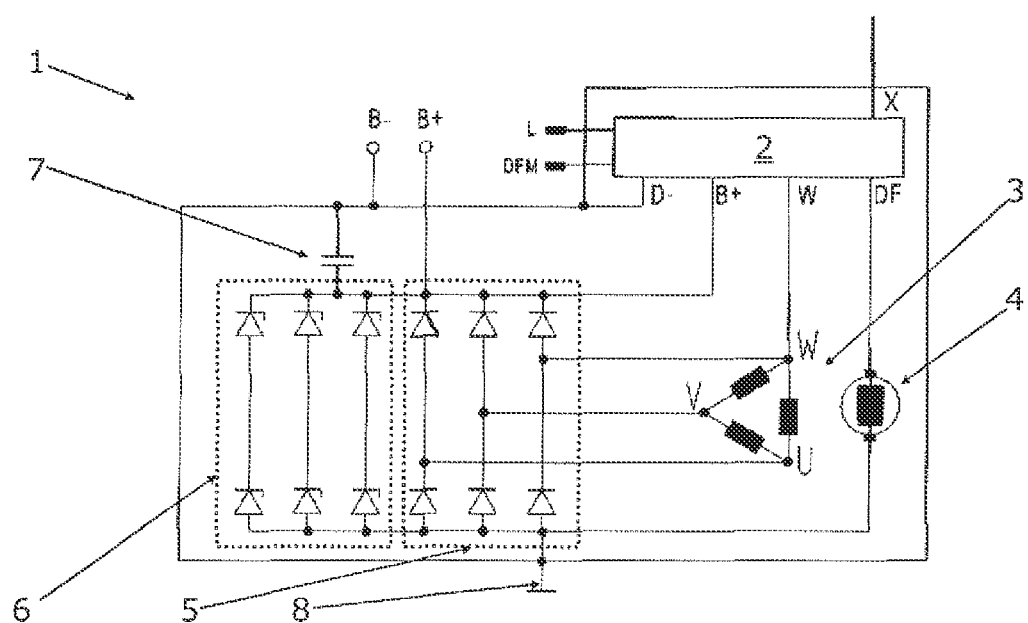
FIG. 1 shows a schematic view of an electrical generator.
Figure 2:
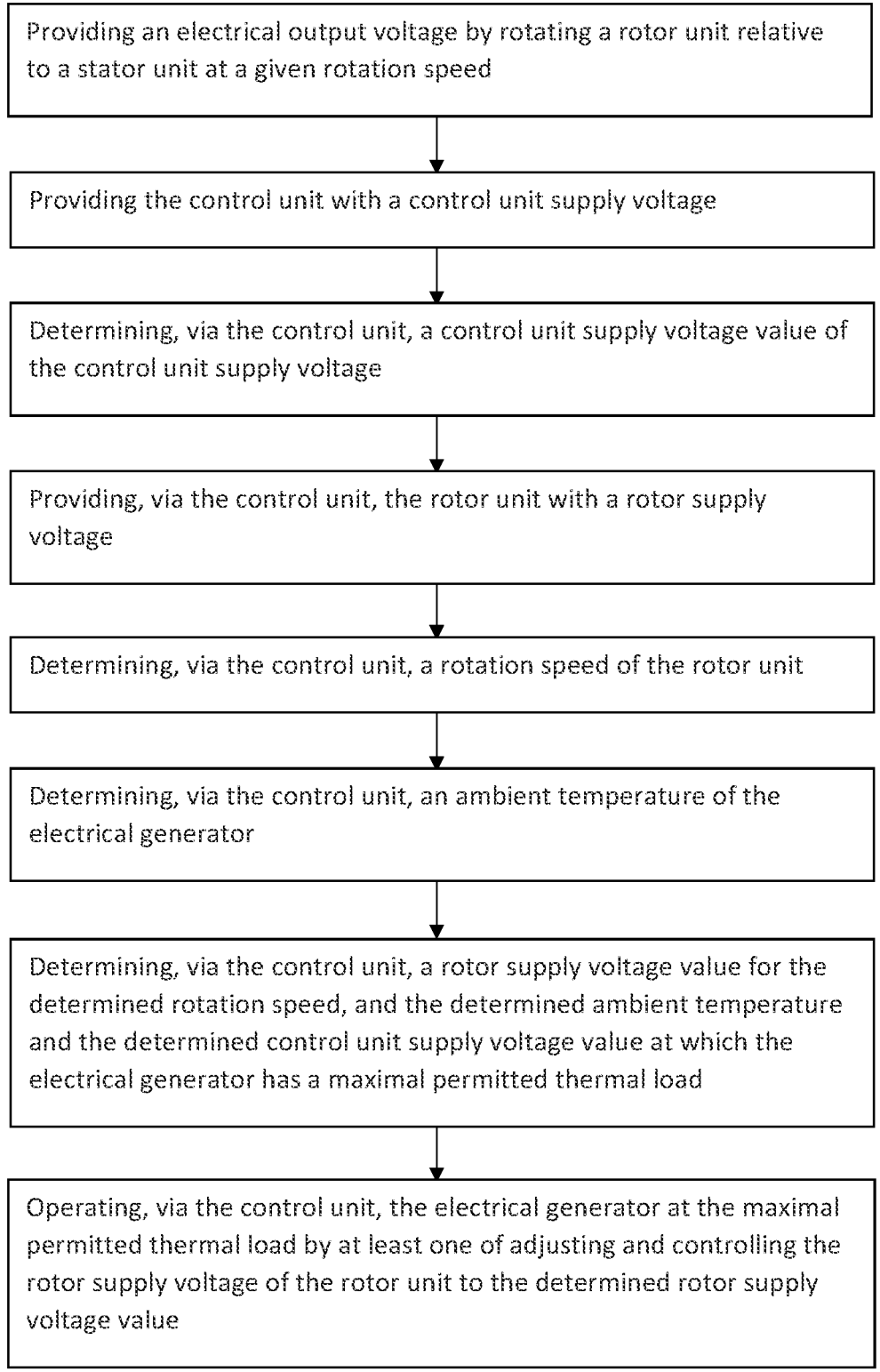
FIG. 2 shows a schematic flow chart of a method of operating an electrical generator.

FIG. 1 shows a schematic view of an electrical generator 1, particularly an alternator for a vehicle, with a control unit 2. The control unit comprises terminals "D-", "B", "W", "DF", "L", "DFM" and "X". The terminal "L" is used for an external voltage supply of the control unit 2. The terminal "DFM" provides an electrical signal proportional to the degree of load of the generator. The terminal "W" electrically connected to one coil of a stator unit 3 in order to measure the rotation speed of a rotor unit 4. The terminal "DF" electrically connected to one coil of a rotor unit 4 in order to provide a rotor coil of rotor unit 4 with a rotor supply voltage. The terminals "D-" and "B+" are used to determine and/or measure the output voltage of the electrical generator 1 across the terminals "B-" or ground 8 and "B+". An isolated ground for "B-" and/or an internal voltage supply for "B+" are optional, other terminals which are indicated by terminal "X" with functionality as per state of the art can be implemented (warning lamp control, ignition key detection, analog and digital communication protocols—CAN, LIN, BSS, RVC, PCM, C-Term). The terminal "X" is optional. The terminal "B+" provides the output voltage of the electrical generator 1. The terminal "X" may comprise several terminals to provide the functionalities described above.

The rotor unit 4 is rotated relative to a stator unit 3 at a given rotation speed. The rotor unit 4 and/or the rotor coil induce a three-phase alternating current and/or a three-phase alternating voltage in the stator unit 3. The stator coils terminals "W", "V" and "U" are configured in a delta configuration and are connected to a rectifier unit 5 which converts the three-phase alternating current and/or a three-phase alternating voltage into a direct current and/or direct voltage. The rectifier unit 5 may comprise six diodes. Two diodes may be connected in series and forming a pair, while the pairs of the diodes may be connected in parallel to each other. Between two diodes of a pair, one of the stator coil terminals "W", "V" and "U" may be connected.

A safety unit 6 may comprise at least one Zener diode. The safety unit 6 may comprise a combination of 14V and 28V Zener diodes in order to obtain a breakdown voltage between 62-65V (5 mA conduction at 25° C.) for an electrical generator with an output voltage of 48V or 56V. In the case of an electrical generator with an output voltage of 14V, exclusively 14V Zener diodes may be used, while with for an output voltage of 28V exclusively 28V Zener diodes may be used. The safety unit 6 may comprise at least six Zener diodes. In case of a 14V/28V system, the rectifier diodes may be directly replaced with Zener diodes which perform both rectification and overvoltage protection. Thus, such a 14V/28V system may comprise only 6 diodes in total. The shown circuit with 12 diodes (6+6) is required for a 48V/56V system, because 56V Zener diodes of suitable quality and in standard press-fit package form are not available on the market.

The electrical generator 1 comprises a capacitor unit 7 for reducing electrical output voltage ripples and a ground 8.

The invention claimed is:

1. A method of operating an electrical generator with a control unit, comprising:
   providing an electrical output voltage by rotating a rotor unit relative to a stator unit at a given rotation speed;
   providing the control unit with a control unit supply voltage;
   determining, via the control unit, a control unit supply voltage value of the control unit supply voltage;
   providing, via the control unit, the rotor unit with a rotor supply voltage;
   determining, via the control unit, a rotation speed of the rotor unit;
   determining, via the control unit, an ambient temperature of the electrical generator;
   determining, via the control unit, a rotor supply voltage value for the determined rotation speed, and the determined ambient temperature and the determined control unit supply voltage value at which the electrical generator has a maximal permitted thermal load; and
   operating, via the control unit, the electrical generator at the maximal permitted thermal load by at least one of adjusting and controlling the rotor supply voltage of the rotor unit to the determined rotor supply voltage value.

2. The method according to claim 1, wherein:
   the control unit supply voltage is an external control unit supply voltage provided by an external voltage source;
   the control unit supply voltage is an internal control unit supply voltage provided by the electrical output voltage of the electrical generator; or
   the control unit supply voltage is a combination of an external control unit supply voltage provided by an external voltage source and an internal control unit supply voltage provided by the electrical output voltage of the electrical generator.

3. The method according to claim 1, wherein:
   the control unit provides a data storage unit in which at least one value table is stored;
   the control unit determines the rotor supply voltage value to be applied to the rotor unit by comparing the determined rotation speed, the determined ambient temperature and the determined control unit supply voltage value with the at least one stored value table; and
   the at least one stored value table provides the relation between rotation speed of the rotor unit, the ambient temperature of the electrical generator, the determined control unit supply voltage value and a required rotor supply voltage value for an operation of the electrical generator at a maximal permitted thermal load.

4. The method according to claim 3, wherein the at least one stored value table is determined by:
   at least one of measuring and adjusting the rotation speed of the rotor unit, the ambient temperature of the electrical generator and the determined control unit supply voltage value;
   measuring the thermal load of the electrical generator, while the rotor supply voltage of the rotor unit is adjusted until the thermal load of the electrical generator reaches the maximal permitted thermal load; and
   storing in the value table:
   the rotor supply voltage value at which the maximal permitted thermal load of the electrical generator is achieved with the corresponding rotation speed of the rotor unit, the ambient temperature of the electrical generator and the determined control unit supply voltage value.

5. The method according to claim 4, wherein the at least one stored value table is determined by:
   at least one of measuring and adjusting the rotation speed of the rotor unit in a rotation speed range of 1100 to 15000 rpm;
   at least one of measuring and adjusting the ambient temperature of the electrical generator in a temperature range of 15° C. to 130° C.; and
   adjusting the control unit supply voltage value between 5V and 60V.

6. The method according to claim 1, wherein the electrical generator exceeds the maximal permitted thermal load for a predefined time period in order to improve the step load response of the electrical generator.

7. The method according to claim 6, wherein the rotor unit is supplied with at least one of the internal control unit supply voltage and the external control unit supply voltage during the predefined time period without voltage limitation.

8. The method according to claim 6, wherein the control unit initiates a cooling procedure after the predefined time period in order to reduce the thermal load of the electrical generator to the maximal permitted thermal load.

9. The method according to claim 1, wherein a predefined electrical output voltage of the electrical generator is at least one of maintained and controlled by the control unit.

10. A control unit for an electrical generator configured to:
    receive a control unit supply voltage;
    determine a control unit supply voltage value of the control unit supply voltage;
    provide a rotor unit with a rotor supply voltage;
    determine a rotation speed of the rotor unit;
    determine an ambient temperature of the electrical generator;
    determine a rotor supply voltage value for the determined rotation speed, and the determined ambient temperature and the determined control unit supply voltage value at which the electrical generator has a maximal permitted thermal load; and
    operate the electrical generator at the maximal permitted thermal load by at least one of adjusting and controlling the rotor supply voltage of the rotor unit to the determined rotor supply voltage value.

11. The control unit according to claim 10, comprising at least one:
    an ambient temperature unit for determining the ambient temperature of the electrical generator;
    a rotation speed unit for determining the rotation speed of the rotor unit;
    a rotor supply voltage unit for controlling and/or adjusting the rotor supply voltage of the rotor unit;
    a control unit supply voltage unit for determining the control unit supply voltage value of the control unit supply voltage;
    a data storage unit for storing at least one value table; and
    an output voltage control unit for at least one of controlling and maintaining a predefined electrical output voltage of the electrical generator.

12. An electrical generator comprising:
    a rotor unit with at least one rotor coil;
    a stator unit with at least one stator coil, the rotor unit being rotated relative to the stator unit at a given rotation speed; and a control unit configured to:
receive a control unit supply voltage;
determine a control unit supply voltage value of the control unit supply voltage;
provide the rotor unit with a rotor supply voltage;
determine a rotation speed of the rotor unit;
determine an ambient temperature of the electrical generator;
determine a rotor supply voltage value for the determined rotation speed, and the determined ambient temperature and the determined control unit supply voltage value at which the electrical generator has a maximal permitted thermal load; and
operate the electrical generator at the maximal permitted thermal load by at least one of adjusting and controlling the rotor supply voltage of the rotor unit to the determined rotor supply voltage value.

13. The electrical generator according to claim 12, wherein the electrical generator is at least one of formed and operated as a batteryless system.

14. The electrical generator according to claim 12, further comprising at least one of:
a rectifier unit which converts the alternating voltage of the stator coil to a direct voltage;
a safety unit for limiting the electrical output voltage to a maximum electrical output voltage; and
a capacitor unit for reducing electrical output voltage ripples.

15. The electrical generator according to claim 12, wherein the stator unit has three stator coils arranged in a star configuration or in a delta configuration.

16. The electrical generator according to claim 12, wherein at least one of the rotor unit and the rotor coil is optimized for an operation beyond at least one of a critical operation rotation frequency and a critical rotation speed.

17. The electrical generator according to claim 12, wherein at least one of the rotor unit and the rotor coil provides an ampere-turn value of at least 2900 At at a control unit supply voltage of 14V, 28V, 48V or 56V and an ambient temperature of 20° C.

18. The electrical generator according to claim 17, wherein at least one of the rotor unit and the rotor coil has at least 300 turns.

19. A computer program comprising instructions to:
provide an electrical output voltage by rotating a rotor unit relative to a stator unit at a given rotation speed;
provide a control unit with a control unit supply voltage;
determine, by the control unit a control unit supply voltage value of the control unit supply voltage;
provide, by the control unit, the rotor unit with a rotor supply voltage;
determine, by the control unit, a rotation speed of the rotor unit;
determine, by the control unit, an ambient temperature of the electrical generator;
determine, by the control unit, a rotor supply voltage value for the determined rotation speed, and the determined ambient temperature and the determined control unit supply voltage value at which the electrical generator has a maximal permitted thermal load; and
operate, by the control unit the electrical generator at the maximal permitted thermal load by at least one of adjusting and controlling the rotor supply voltage of the rotor unit to the determined rotor supply voltage value.

20. A non-transitory computer-readable medium having instructions stored thereon to:
provide an electrical output voltage by rotating a rotor unit relative to a stator unit at a given rotation speed;
provide a control unit with a control unit supply voltage;
determine, by the control unit a control unit supply voltage value of the control unit supply voltage;
provide, by the control unit, the rotor unit with a rotor supply voltage;
determine, by the control unit, a rotation speed of the rotor unit;
determine, by the control unit, an ambient temperature of the electrical generator;
determine, by the control unit, a rotor supply voltage value for the determined rotation speed, and the determined ambient temperature and the determined control unit supply voltage value at which the electrical generator has a maximal permitted thermal load; and
operate, by the control unit the electrical generator at the maximal permitted thermal load by at least one of adjusting and controlling the rotor supply voltage of the rotor unit to the determined rotor supply voltage value.

* * * * *